UNITED STATES PATENT OFFICE.

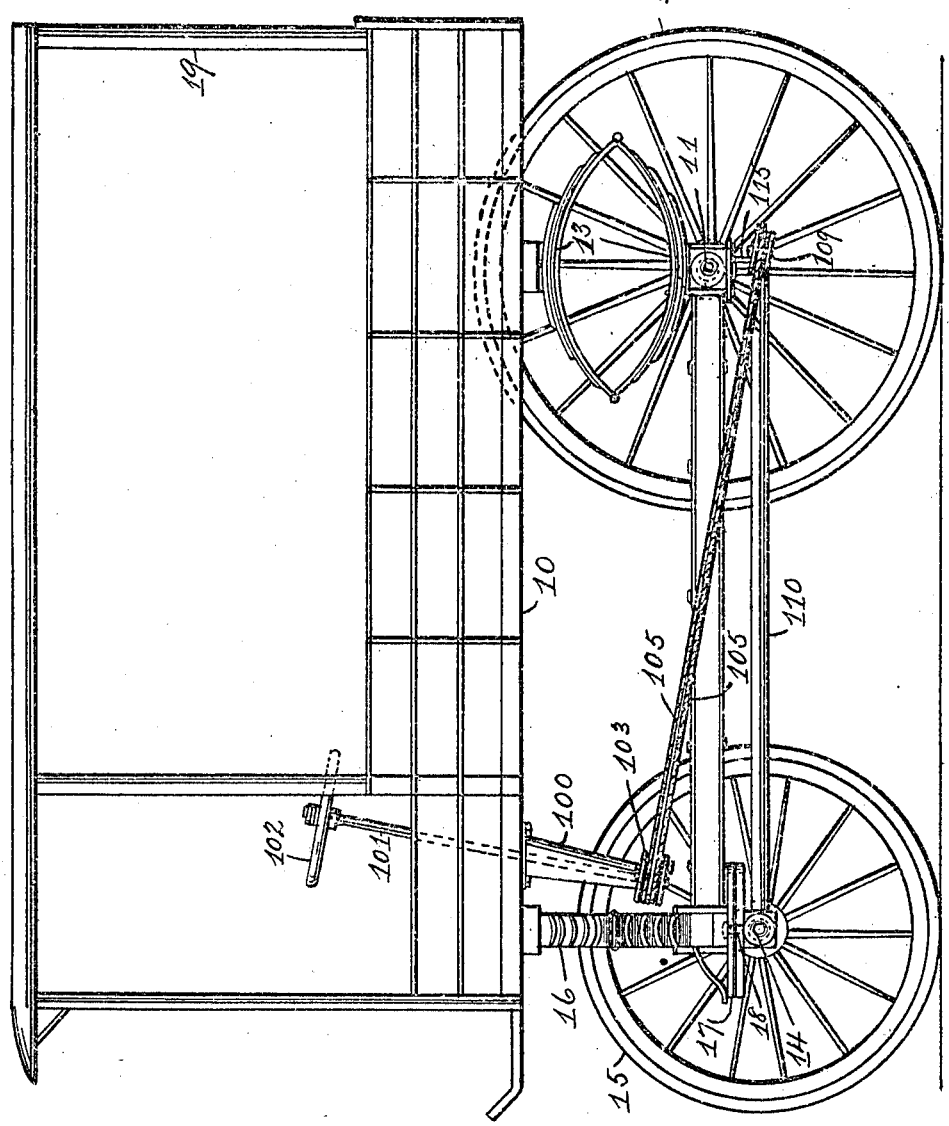

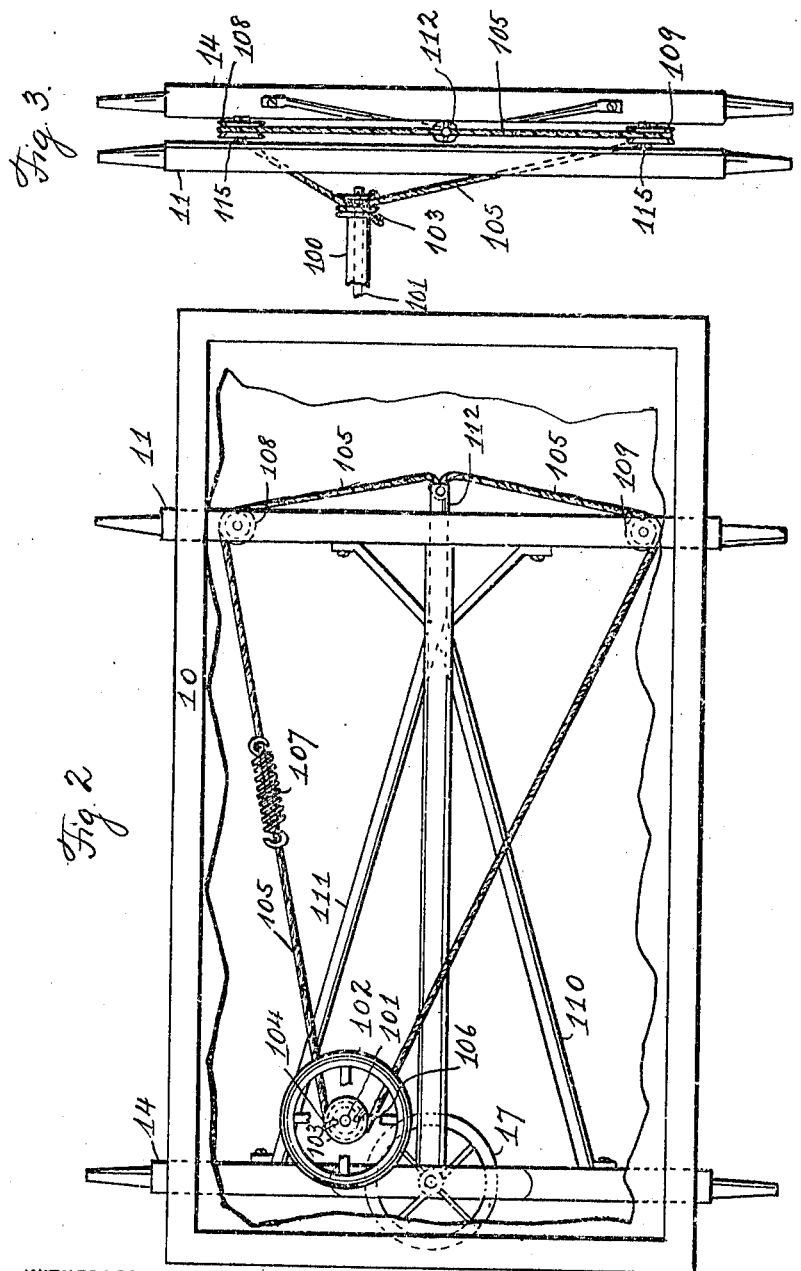

MARTIN V. B. ETHRIDGE, OF NEW YORK, N. Y.

AUTOMOBILE WAGON.

956,060.

Specification of Letters Patent.

Patented Apr. 26, 1910.

Application filed July 10, 1907. Serial No. 382,972.

*To all whom it may concern:*

Be it known that I, MARTIN V. B. ETHRIDGE, a citizen of the United States, and a resident of New York, in the county of New York and State of New York, have invented certain new and useful Improvements in Automobile Wagons, of which the following is a specification.

My invention relates to wagons and more particularly to forms of wagons designed to be used without horses, and its novelty consists in the construction and adaptation of the parts designed to be used in steering such a wagon.

The purpose of the invention is to take a wagon of a common type known as the "three spring" wagon and to equip it with as little change as possible with an automobile propelling rig. In a co-pending application for Letters Patent of the United States, Serial No. 338,971 filed by me on the 10th day of July, 1907, I have described and claimed such an automobile rig and the means of securing it to a wagon of the type described and of operating it. The subject matter of the present application is the equipment of such a wagon with means for steering it after it has been equipped as stated.

The wagon itself comprises a suitable body, a non-rotatable rear axle with traction wheels revolving independently thereon, a non-rotatable front axle with similar traction wheels, two longitudinally placed elliptical springs interposed between the rear axle and the wagon body and a transversely placed elliptical spring interposed between the front axle and the body. It also includes the usual fifth wheel and king bolt.

To equip a wagon constructed as described with a steering rigging, I first provide near the front of the wagon and conveniently located to the usual driver's seat the steering wheel having a downwardly projecting shaft passing through a suitable support or bearing underneath the wagon body and terminating in a sheave substantially at right angles to the shaft of the wheel. I remove the shaft or tongue from the front axle of the wagon and provide it with a rearwardly extending steering tongue underneath the wagon reach and terminating in the vicinity of the rear axle. I secure to the rear axle two pulleys, one on each side of the center, and I pass a cable or rope from the steering disk around such pulleys and back to the disk again. It is apparent that in practice the ends of the cable are so wound upon the sheave that when the latter is turned in one direction one end will be wound thereon while the other will pay off therefrom, and similarly when the sheave is turned in the reverse direction the latter end of the cable will be wound thereupon while the first mentioned end will be unwound therefrom. By these means the oscillation of the steering tongue is secured through the steering wheel and shaft and the wheels being turned as desired, the wagon moves in the required direction.

In the drawings, Figure 1 is a side elevation of a vehicle of the type described embodying my invention; Fig. 2 is a plan view of the same beneath the plane of the wagon body which is broken away to show the concealed parts beneath it, and Fig. 3 is an end elevation looking from the rear of the wagon toward the front.

In the drawings, 10 is the body of an ordinary wagon of what is known as the "three spring" type. It is provided with a non-rotatable rear axle 11 to which are secured in the usual manner at each end independently revoluble traction wheels 12. Elliptical springs 13 are interposed between the rear of the body and this axle in the usual manner, that is, they are longitudinally placed. It is also provided with a non-rotatable front axle 14 to which are secured in the usual manner at each end independently revoluble traction wheels 15. An elliptical spring is interposed between the axle 14 and the body 10 and arranged transversely to the latter. The wagon is also provided with the usual fifth wheel 17 and king bolt 18. If desired, a frame 19 and a canopy may be secured to the body 10. The parts described form no part of my invention.

Mounted at the front of the wagon body and underneath the same is a support or bearing 100 adapted to receive the shaft 101 of a steering wheel 102. The shaft terminates at its lower extremity in a sheave 103 to which are permanently secured one end 104 of a cable 105 leading around to the rear of the wagon, as will be presently described, and terminating in another end 106 also secured to the sheave at a different level. If desired, a spring 107 is inserted in the line of the rope or cable 105 to afford a greater elasticity of operation.

Secured to the front axle 14 are two forks 110, 111, coming together toward the rear axle and forming thereat a single piece 112 which terminates just beyond such rear axle. To this piece 112 is secured by any suitable means the rope or cable 105 which passes around idle pulleys 108 and 109 rotating on brackets 115 depending from the rear axle.

It is obvious that when the wheel 102 is moved it causes the pulley 103 to revolve and winds up the rope or cable 105 in the direction in which it is turned and unwinds it in the other direction. This motion transmitted along the rope or cable 105 to the fork reach moves the front axle and causes it to swing on the king bolt 18 and so secures the movement of the vehicle in the direction required.

What I claim as new is:—

1. In a motor vehicle, the combination with a body, of a rear axle fixed against turning on the body, a front axle pivoted to the body, a steering shaft journaled in the body and having a sheave at its lower end, a tongue fixed to the front axle and extending rearwardly beyond and beneath the rear axle, depending idlers journaled on the rear axle on opposite sides of the tongue, and cables wrapped upon the sheave and passing about the idlers, said cables being fixed to the rear end of the tongue adjacent to the axle.

2. In a motor vehicle, the combination with a vehicle body, of a rear axle fixed against turning to the body, and a front pivotally mounted axle, springs interposed between the axles and body, convergently disposed forks having their front ends fixed to the front axle on opposite sides of its pivot axis, said forks having their rear ends secured together and located beneath the rear axle, a bearing sleeve secured to the underside of the body and depending therefrom, a shaft journaled in said body and sleeve and projecting below the latter, a sheave fixed to the projecting lower end of the shaft, depending idlers journaled on the rear axle on opposite sides of the connected ends of the forks, and cables wrapped upon the sheave, passing about the idlers, and secured to the rear end of the forks.

Witness my hand this 8th day of July, 1907, at the city of New York, in the county and State of New York.

MARTIN V. B. ETHRIDGE.

Witnesses:
HERMAN MEYER,
ALAN McDONNELL.